United States Patent [19]

Keenan

[11] Patent Number: 5,112,096
[45] Date of Patent: May 12, 1992

[54] GLARE-REDUCED SHIELD ASSEMBLY FOR SUN VISOR

[76] Inventor: John B. Keenan, 2535 Chassé, Ste Foy, Quebec, Canada, G1W 1M1

[21] Appl. No.: 733,622

[22] Filed: Jul. 22, 1991

[51] Int. Cl.⁵ .................................................. B60J 3/00
[52] U.S. Cl. ..................................... 296/97.6; 296/97.8
[58] Field of Search ........................... 296/97.6, 97.8; 160/DIG. 3

[56] References Cited

U.S. PATENT DOCUMENTS

| 2,201,197 | 5/1940 | Minor, Jr. | 296/97.8 |
| 2,685,336 | 8/1954 | Menighan | 296/97.8 X |
| 4,323,275 | 4/1982 | Lutz | 296/97.8 |
| 4,690,451 | 9/1987 | Killar | 296/97.6 |
| 4,776,628 | 10/1988 | Polito | 296/97.6 |

FOREIGN PATENT DOCUMENTS 2332613 1/1975 Fed. Rep. of Germany ..... 296/97.8

Primary Examiner—Dennis H. Pedder
Attorney, Agent, or Firm—Robic

[57] ABSTRACT

A retractable glare-reducing shield assembly comprises a sleeve defining an open-ended tubular passage and including a pair of overlapping side panels forming between them a chamber in which a glare-reducing shield is received. The shield has one end extending through a suitable opening of the chamber so that it can be made to move between an extracted position, where its major portion extends out of the chamber and a retracted position where its major portion lies in the chamber. Constraining arrangements allow the shield to be moved only between the extracted and retracted positions.

16 Claims, 2 Drawing Sheets

GLARE-REDUCED SHIELD ASSEMBLY FOR SUN VISOR

BACKGROUND OF THE INVENTION

1. Field of the Invention

The present invention relates to a retractable glare-reducing shield assembly for mounting on a sun visor of a motor vehicle, as a visor extension for use when the sun is close to the horizon.

2. Description of the prior art

It is a well known fact that conventional sun visors do not provide drivers of motor vehicles with an adequate visual protection when the sun is low on the horizon. Inventors have attempted for many years to solve this problem, as revealed by the following U.S. Pat. Nos. known to the present Applicant:

3,948,554 of 1976
4,023,855 of 1977
4,058,340 of 1977
4,169,552 of 1979
4,248,474 of 1981
4,330,148 of 1982
4,728,142 of 1988
4,736,979 of 1988
4,776,628 of 1988
4,792,176 of 1988
4,828,314 of 1989
Canadian Patent No.:
1,219,618 of 1987

In spite of these attempts, one can drive for miles when the sun is low, and meet other vehicles in which the sun visors have been moved down and still the drivers are blinded by the low sun because the visors are not provided with any extensions such as those suggested in the patents, even though people constantly complain about this situation.

A study of the various devices disclosed by the above listed prior art reveals that the known sun visor extenders that has been patented so far, are often complex in structure and therefore probably expensive, and/or not very easy to use and/or mount on the existing sun visors.

SUMMARY OF THE INVENTION

The main object of the invention is to propose a sun visor extender which can readily be slid over and removed from a conventional sun visor hereby eliminating the need of any mechanical attachment device.

Another object lies in providing a sun visor extender of the above type of simple structure which can be manufactured at such low cost that it can serve as a convenient promotional gift that firms will be pleased to give to their clients.

Yet another object of the invention is to provide a sun visor extender which, in one particular embodiment, can be adjusted to fit over visors of different sizes.

More specifically, the sun visor extender of the invention is in the form of a retractable glarereducing shield assembly which comprises a sleeve defining an open-ended tubular passage, and including a pair of overlapping panels which are fixed together so as to form between them a shield-receiving chamber having a bottom at one end and a shield opening at the opposite end; the assembly further includes a glare-reducing shield which is mounted in the chamber for movement between an extracted position, where it extends out of the chamber, and a retracted position, where it lies in the chamber. Restraining means are provided which prevents the shield from moving out of the chamber when it is in the extracted position.

According to one preferred embodiment, one of the overlapping panels has a through slot having a bottom edge adjacent to the chamber opening, the slot extending in the direction of movement of the shield. According to this embodiment, the restraining means comprise a hook at one end of the shield turned toward the slotted panel and inserted into the slot for slidable movement, the assembly being constructed so that, in the extracted position, the hook engages the slot bottom edge and holds the shield to prevent it from moving completely out of the chamber through its opening, the chamber bottom limiting inward movement of the shield.

Preferably, the shield assembly further comprises a protection membrane which is fixed to one of the overlapping panels on the inside of the tubular passage so as to isolate the slot and the hook of the shield from the passage.

According to still another embodiment of the invention, the sleeve is made from a sheet of flexible cardboard material which is divided into successive first, second, third, fourth and fifth panels folded at right angle to form the sleeve passage with the first and fifth panels being the aforesaid overlapping inner and outer panels. In this embodiment, there is further provided a glueing strip covered with a pealable protection sheet, the strip being fixed to the third panel and extending lengthwise of the sleeve passage at about mid height and outwardly of the passage; a tear line being provided on the third panel, immediately above the glueing strip; and fold line being provided on the fourth and fifth panels, these fold lines being parallel to the tear line.

Other objects and further features of the invention will be revealed by the description that follows having reference to the appended drawings.

BRIEF DESCRIPTION OF THE DRAWINGS

In FIGS. 4, 5, 7 and 8, the thickness of the various components has been exaggerated to show the applied principle better.

DESCRIPTION OF THE PREFERRED EMBODIMENTS

Figure 1:
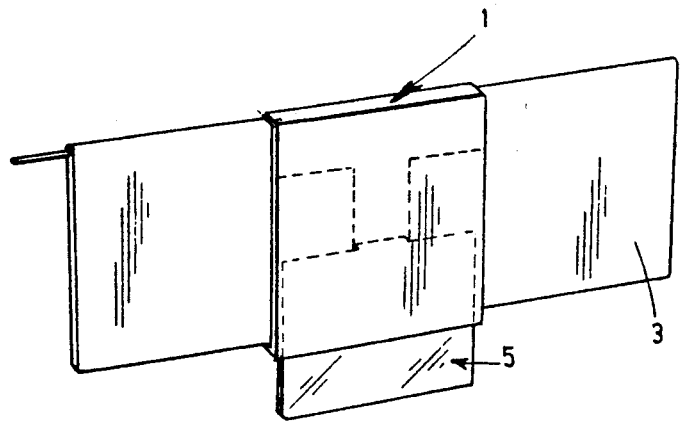
FIG. 1 is a perspective view of a retractable glare-reducing shield assembly made according to the invention and seen mounted on a conventional sun visor.

As shown in FIG. 1, the retractable glare-reducing assembly 1 is mounted over a standard rectangular sun visor 3, generally of even thickness. Assembly 1 is constructed so as to slide easily along the visor 3 and removed therefrom, if desired. It has a retractable glare-reducing shield 5 that can be moved up and down relative to the visor 3 as will be seen hereinafter.

Figure 2:
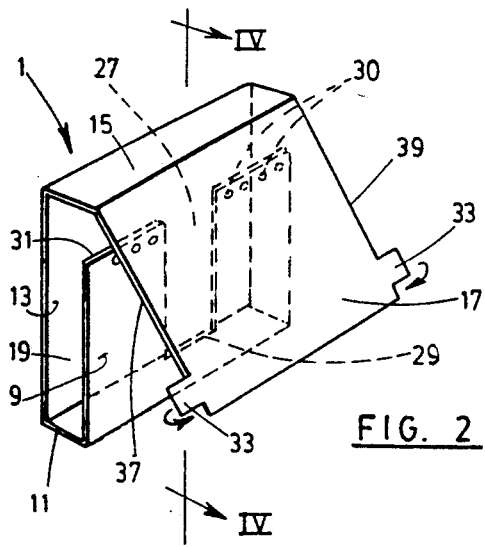
FIG. 2 is a perspective view of the sleeve of an assembly according to one embodiment of the invention, shown in partly closed position.
Figure 4:
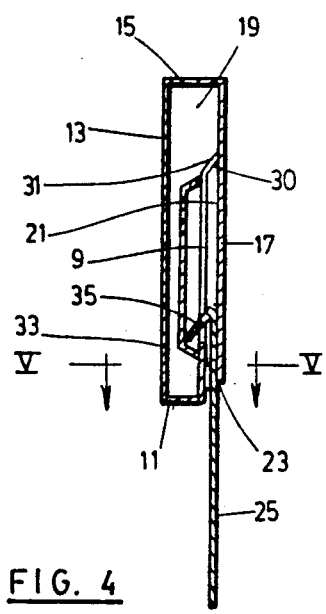
FIG. 4 is a cross-sectional view in a vertical transverse plane of the completed shield assembly, taken at the longitudinal center of the sleeve, essentially along line IV—IV in FIG. 2.
Figure 5:
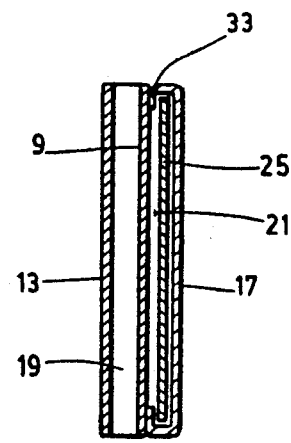
FIG. 5 is a cross-sectional view along line V—V in FIG. 4.

As said before, the assembly 1 comprises a rectangular sleeve shown in partially completed condition in FIG. 2. This sleeve is made of semiflexible card-board material, preferably of the Bristol board type. The sheet is divided into five successive rectangular panels 9, 11, 13, 15 and 17 folded at right angles to form a sleeve passage 19; the end panels overlapping one another, panel 9 being on the inside, panel 17 on the outside, as best seen in FIGS. 4 and 5. These overlapping panels are slightly spaced from one another to form between them a chamber 21 having an opening 23 for the passage of a glare-receiving shield 25. The latter is preferably made from a transparent tinted plastic capable of reducing the intensity of sun rays to which the driver may be exposed. It is slidable through opening 23 for movement between an extracted position, as in FIG. 4, where a major portion extends out of the chamber 21, and a retracted position where most of it lies within the chamber. The assembly 1 further comprises restraining means, to be detailed hereinbelow, that allow the shield 25 to be moved only between these two positions.

As clearly illustrated in FIG. 2, the inner panel 9 is formed, at its longitudinal center, with a through U-shaped slot 27 having a bottom edge 29, adjacent to the chamber opening 23, the slot extending in the direction of movement of the shield 25.

The aforesaid means for fixing the panels 9, 17 together may include spots 30 of adhesive material attaching the upper edge, that is the top border 31, FIG. 4, of the inner panel 9 to the back of the outer panel 17 (forming also the bottom of the shield chamber 21), in conjunction with a pair of locking tabs 33 provided adjacent to the lower edge of the outer panel 17, along edges 37, 39 on either side of the chamber opening 23, these tabs being folded as shown by the arrows in FIG. 2, and made fast with the inner panel 9. In this matter, it will be appreciated that these fixing means are able to hold the two overlapping panels 9, 17 firmly together to form the aforesaid shield chamber and its opening 23.

Figure 3:
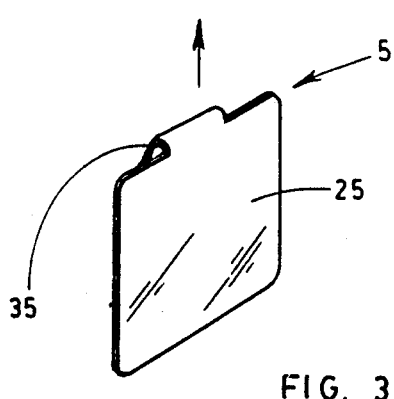
FIG. 3 is a perspective view of a glarereducing shield to be slid into a receiving chamber in the sleeve of FIG. 2.

The shield movement restraining means mentioned above, comprise a hook 35 (FIG. 3) punched out of the shield 25 and bent, in the completed condition of the assembly 1, FIG. 4, toward the inner panel 9, fitting snugly in the slot 27. In extracted condition, it engages the bottom edge 29 and thus prevents the shield from moving out of the chamber 21. In the retracted position, further insertion of the shield is prevented by the bottom of the chamber 21.

Figure 6:
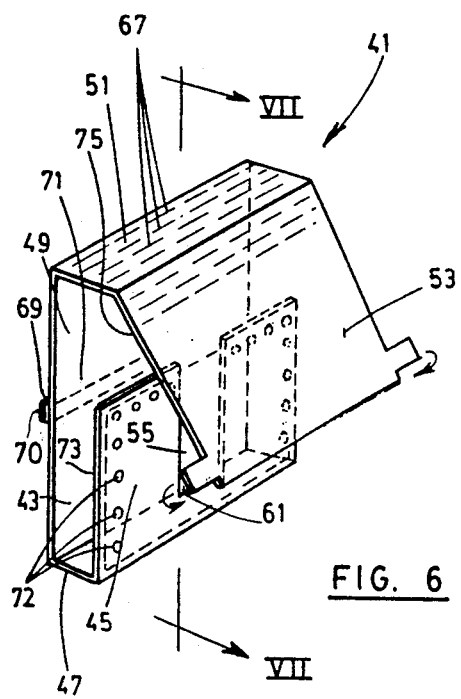
FIG. 6 is a view similar to that in FIG. 2 but of another embodiment.

In the embodiment of FIG. 2, the sleeve 1 is sized to fit over most sun visors, particularly automobile sun visors, without size adjustment. In the embodiment of FIG. 6, the sleeve 41 is made adjustable by the user so as to fit over sun visors of variable sizes.

Here again, a sleeve passage 43 is obtained by the folding at 90°, of five successive panels 45, 47, 49, 51 and 53, panel 45 being cut out to form a hook slot 55 and the panels 45 and 53 being secured to one another in overlapping condition to form a shield chamber 57, as in the first embodiment, having its opening 59 located adjacent to the bottom edge 61 of the slot.

In this embodiment, the height of the passage 43 is selected so as to allow the sleeve 41 to fit over the largest sun visors. This requires that the height of the panels 49 and of the panels 45 and/or 53 be appropriately selected, panels 47, 51 having the same width.

Where the height of the sun visor over which the sleeve 41 is to be slid is smaller than the height of the tubular passage 43, adjustment is obtained by means of a series of parallel fold lines 67 on panels 51 and 53, a conventional glueing strip 69 being provided which is fixed to the panel 49 along with a tear line 71 immediately above the strip 69, the glueing strip having a pealable protection sheet 70.

In use, the panel 49 is first cut out along the tear line 71, the sleeve 41 fitted over the sun visor, and the freed upper part of the panel 49 pulled over the glueing strip 69 sufficiently to allow the sun visor to fit inside the sleeve passage 43 in a slidable manner. The protection sheet of the glueing strip 69 is then removed and the freed upper part of the panel 49 pressed on it to preserve the proper size of sleeve passage 43.

In this embodiment, the locking tabs (33 in FIG. 2) have been replaced by spots 72 of adhesive material such as glue, provided along corresponding lateral edges 73, 75 of panels 45, 53 to hold them together along with similar strips at the top border of the panel 45, as in the previous embodiment. It will be appreciated that this variant can also be applied to the sleeve 1 in FIG. 2.

In order to protect the sun visor against the hook 67, a flexible protection membrane 77 may be fixed to the inner panel 45, on the inside of the tubular passage 43, so as to isolate the hook 67 from the passage and thus from the sun visor itself. This particular variant can also be provided in the sleeve 41 of the first embodiment.

In this second embodiment, as will be appreciated, the glare-reducing shield is the same as in the first embodiment of FIG. 2.

Figure 7:
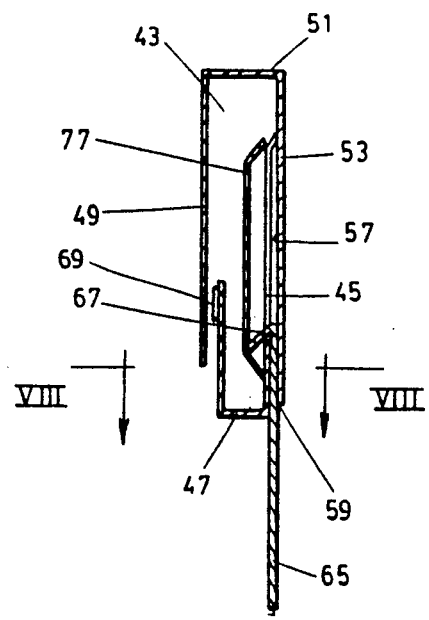
FIG. 7 is a cross-sectional view in a transverse vertical plane of the completed shield assembly according to the second embodiment, essentially along line VII—VII in FIG. 6
Figure 8:
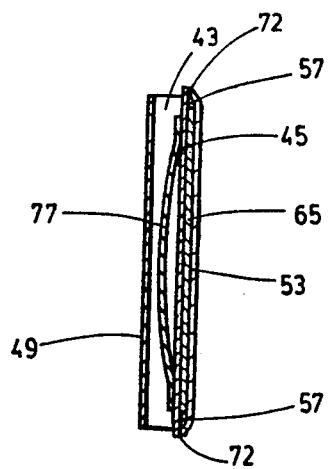
FIG. 8 is a cross-sectional view along line VIII—VIII in FIG. 7.

Numerous modifications can be made to the invention, that must be considered as falling within the scope of the appended claims. Thus, by way of example, the inner panel 9 (FIG. 2) or 45 (FIG. 6) could be joined with more than one U-shaped slot. In such a case, the slots would be parallel and, of course, the shield 25 (FIG. 3) or 65 (FIG. 7) would be provided with a similar number of hooks positioned and sized into the slots. Therefore, it must be understood that when reference is made to one U-shaped slot and one hook only in the claims, these claims should in practice be interpreted as covering the case when more than one slot and one hook are used.

What is claimed is:

1. A retractable glare-reducing shield assembly comprising:
   a sleeve defining an open-ended tubular passage, said sleeve including a pair of overlapping panels comprising an inner panel located inside said passage, said inner panel having a top border, and an outer panel forming one lateral side of said sleeve;
   means fixing said panels together so as to form between them a shield-receiving chamber having a closed end and a chamber opening opposite said closed end; said fixing means including spots of adhesive material attaching together the top border of said inner panel to said outer panel to form said closed end of said chamber;

a glare-reducing shield mounted in said chamber for movement thereof through said chamber opening between an extracted position, where a major portion of said shield extends out of said chamber, and a retracted position where said major portion lies in said chamber; and restraining means preventing said shield from moving out of said chamber when in said extracted position, wherein said inner panel is formed with a through slot having a bottom edge adjacent said chamber opening, said slot extending in a direction of movement of said shield, and wherein said restraining means comprise a hook at one end of said shield, said hook being turned toward said inner panel and slidably inserted into said slot in such a manner that, in said extracted position, said hook engages said slot bottom edge and holds said shield to prevent it from moving out of said chamber through said chamber opening, said closed end of said chamber limiting inward movement of said shield within said chamber.

2. A shield assembly as claimed in claim 1, further comprising a protection membrane fixed to said inner panel inside said tubular passage whereby to isolate said slot and said hook of said shield from said passage.

3. A shield assembly as claimed in claim 2, wherein said hook is sized to fit snugly in said slot.

4. A shield assembly as claimed in claim 1 wherein said fixing means further include locking tabs along edges of said outer panel located on either side of said chamber opening, said tabs being folded back and made fast with said inner panel.

5. A shield assembly as claimed in claim 4, further comprising a protection membrane fixed to said inner panel inside said tubular passage whereby to isolate said slot and said hook of said shield from said passage.

6. A shield assembly as claimed in claim 5, wherein said hook is sized to sit snugly in said slot.

7. A shield assembly as claimed in claim 1 wherein said panel fixing means further include additional spots of adhesive material along edges of said inner and outer panels, on either side of said chamber opening.

8. A shield assembly as claimed in claim 7, further comprising a protection membrane fixed to said inner panel inside said tubular passage whereby to isolate said slot and said hook of said shield from said passage.

9. A shield assembly as claimed in claim 8, wherein said hook is sized to fit snugly in said slot.

10. A shield assembly as claimed in claim 1, wherein said sleeve is made from a sheet of flexible cardboard material divided into successive first, second, third, fourth and fifth panels folded at right angles to form said sleeve passage with said first and fifth panels being said inner and outer panels.

11. A shield assembly as claimed in claim 10, wherein said cardboard material is bristol board.

12. A shield assembly as claimed in claim 10, further comprising a protection membrane fixed to said inner panel inside said tubular passage whereby to isolate said slot and said hook of said shield from said passage.

13. A shield assembly as claimed in claim 1, wherein said sleeve is made from a sheet of flexible cardboard material divided into successive first, second, third, fourth and fifth panels folded at right angles to form said sleeve passage with said first and fifth panels being said inner and outer panels, said assembly further comprising:

a glueing strip covered with a pealable protection sheet, said strip being fixed to said third panel and extending lengthwise of said sleeve passage at about midheight of said third panel and outwardly of said passage;

tear line means on said third panel immediately above said glueing strip; and fold line means including fold lines on said fourth and fifth panels, said fold lines being parallel to said tear line means.

14. A shield assembly as claimed in claim 13, further comprising a protection membrane fixed to said inner panel inside said tubular passage whereby to isolate said slot and said hook of said shield from said passage.

15. A shield assembly as claimed in claim 14, wherein said hook is sized to fit snugly in said slot.

16. A shield assembly as claimed in claim 12, wherein said fixing means further include locking tabs along edges of said outer panel located on either side of said chamber opening, said tabs being folded back and made fast with said inner panel.

* * * * *